United States Patent [19]

Belcher et al.

[11] Patent Number: 4,948,055

[45] Date of Patent: Aug. 14, 1990

[54] FUEL INJECTOR

[75] Inventors: Bryan L. Belcher, Warwick; David W. Wrightham, Leicester; Kenneth G. Page, Warwick, all of England

[73] Assignee: Rolls-Royce plc, London, England

[21] Appl. No.: 352,952

[22] Filed: May 17, 1989

[30] Foreign Application Priority Data

May 27, 1988 [GB] United Kingdom ............... 8812589

[51] Int. Cl.$^5$ ............................. F02C 7/22; B05B 7/06
[52] U.S. Cl. .................... 239/419.5; 239/422; 239/425.5; 239/427.5; 239/428; 60/39.55
[58] Field of Search ................ 239/400, 419.5, 422, 239/423–424.5, 425.5, 427.5, 428; 60/39.465, 39.55, 733, 742, 746

[56] References Cited

U.S. PATENT DOCUMENTS

| 4,041,699 | 8/1977 | Schelp .............................. 60/39.55 |
| 4,327,547 | 5/1982 | Hughes et al. .................... 60/39.55 |
| 4,337,618 | 7/1982 | Hughes et al. .................... 60/39.55 |

FOREIGN PATENT DOCUMENTS

| 1118653 | 7/1968 | United Kingdom . |
| 1383627 | 2/1975 | United Kingdom . |
| 2055186 | 2/1981 | United Kingdom . |

Primary Examiner—Andres Kashnikow
Assistant Examiner—Karen B. Merritt
Attorney, Agent, or Firm—Cushman, Darby & Cushman

[57] ABSTRACT

A gas turbine engine fuel injector comprises a main center body portion at the upstream end of which is located a steam injector. The steam injector is adapted to optionally direct steam into the air inlet of the main body portion so as to reduce the production of the oxides of nitrogen, and optionally increase engine power output.

6 Claims, 2 Drawing Sheets

FUEL INJECTOR

BACKGROUND OF THE INVENTION

1. Field of the Invention

This invention relates to a fuel injector and in particular to a fuel injector suitable for an industrial gas turbine engine.

2. Description of the Prior Art

Industrial gas turbine engines and in particular those adapted for static opertion, are sometimes called upon to operate using a mixture of steam, fuel and air as their primary motive fluid. The use of such a mixture can bring about a reduction in the emission of the oxides of nitrogen of the engines and also an increase in engine power output compared with engines operating using fuel and air alone.

The difficulties in using steam include such things as achievinig a clean switch during operation between the supply of air alone and a mixture of air and steam to the engine combustion apparatus and ensuring that no steam spills around the engines' fuel injectors.

It is an object of the present invention to provide a fuel injector suitable for a gas turbine engine in which such difficulties are substantially avoided.

SUMMARY OF THE INVENTION

According to the present invention, a fuel injector suitable for a gas turbine engine comprises a main body portion having an upstream end and a downstream end, said upstream end being operationally in communication with a region of air at high pressure, said main body portion having one or more passages therein interconnecting said upstream and downstream ends thereof so as to provide an air flow through said main body portion which exhausts from said downstream end thereof, means adapted to direct fuel into said air flow so as to provide intermixing therewith, and steam injection means located in the region of the upstream end of said main body portion, said steam injection means being so configured and arranged as to operationally permit an air flow through said one or more passages from said region of high air pressure and optionally direct steam into said one or more passages, the total exhaust area of said steam injection means being less than the total inlet area of said one or more passages and the pressure of steam at the exhaust outlet of said steam injection means when steeam is exhausted therefrom being higher than the pressure operationally within said one or more passages so that at least the majority of steam so directed enters said one or more passages.

BRIEF DESCRIPTION OF THE DRAWINGS

The invention will now be described, by way of example, with reference to the accompanying drawings in which.

Description of the Preferred Embodiment

Figure 1:
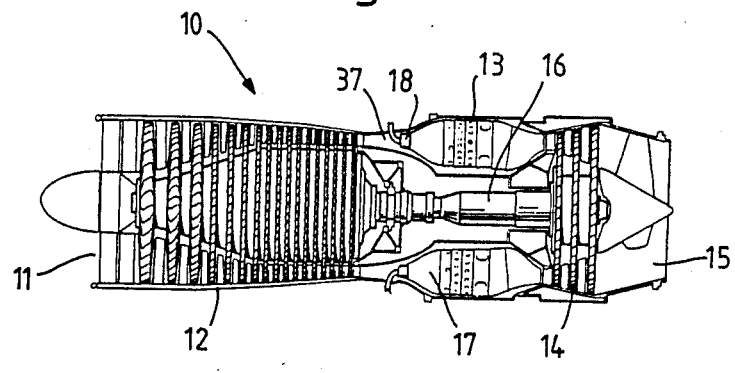
FIG. 1 is a sectioned side view of a gas turbine engine which incorporates a number of fuel injectors in accordance with the present invention.

With reference to FIG. 1, a gas turbine engine generally indicated at 10, is of conventional construction and comprises, in axial flow series, an air intake 11, a compressor section 12, combustion equipment 13, a turbine section 14 and an exhaust nozzle 15. The gas turbine engine 10 functions in the conventional manner. Air drawn in through the intake 11 is compressed in the compressor section 12 before passing to the combustion equipment 13 where it is mixed with fuel and the mixture combusted. The resultant gaseous combustion products then expand through the turbine section 14, which drives the compressor section 12 via a shaft 16, before being exhausted through the exhaust nozzle 15 to drive a suitable power turbine (not shown).

Figure 2:
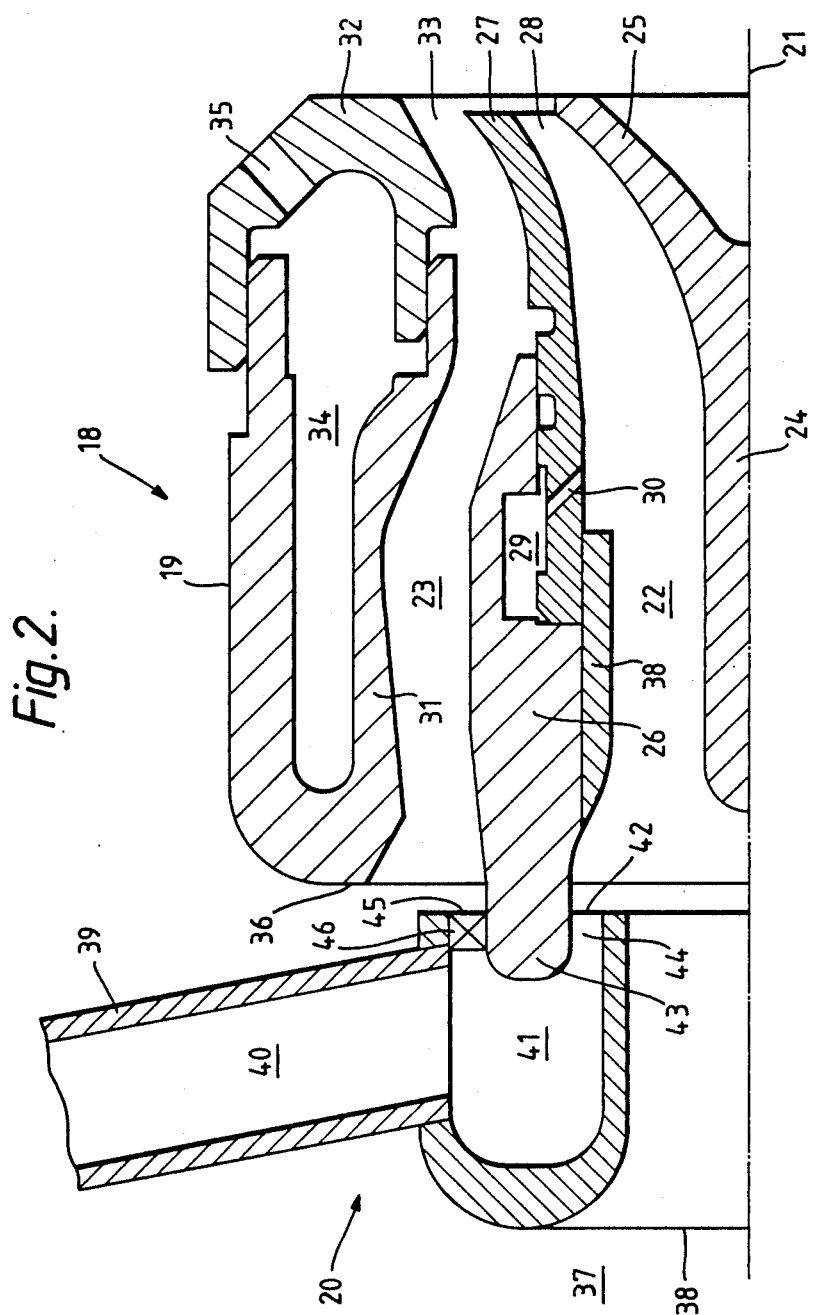
FIG. 2 is a sectioned side view of the upper half of a fuel injector in accordance with the present invention.

The combustion equipment 13 comprises a number of combustion chambers 17, each of which is provided with a fuel injector 18. Each fuel injector 18, one of which can be seen more clearly in FIG. 2, comprises a main body portion 19 and a steam injector 20 positioned at the upstream end of the main body portion 19.

The main body portion 19 has a central axis 21 and defines two annular passages 22 and 23 which are coaxial with the axis 21. The radially innermost passage 22 is defined by a centre body 24 having an outwardly flared downstream portion 25, and a mid-body 26, the downstream portion 27 of which is also outwardly flared. The outwardly flared downstream portion 25 and 27 thereby define a passage 22 outlet 28 which is directed away from the central axis 21.

The mid-body 26 defines a manifold 29 which is, in operation, supplied by conventional means, not shown, with liquid fuel. A number of jets 30 in the mid-body 26 direct that fuel into the radially innermost passage 22.

The radially outermost passage 23 is defined by the mid-body 26 and by an outer body 31. The downstream end 32 of the outer body 31 is chamfered so as to define with the mid-body 26 an outlet 33 which is, like the outlet 28, directed away from the central axis 21.

The outer body 31, mid-body 26 and centre body 24 are all interconnected by appropriate vanes (not shown) which extend across the passages 22 and 23 so as to provide minimal disturbance to flow through the passages 22 and 23.

The outer body 31 defines a manifold 34 which is, in operation, supplied by means not shown with gaseous fuel. A number of jets 35 in the outer body 31 direct that fuel out of the downstream end 32 of the main body portion 19 in a direction away from the central axis 21.

The upstream end 36 of the main body portion 19 is situated in a region 37 of the gas turbine engine 10, as can be seen in FIG. 1, which is immediately downstream of the compressor equipment 12 and therefore in operation contains air at high pressure. That high pressure air flows through the passages 22 and 23 and into the combustion chambers 17 through the fuel injector outlets 28 and 33. When the gas turbine engine 10 is required to operate using liquid fuel, fuel is directed into the radially inner passage 22 through the jets 30 to be atomised by the airflow through the inner passage 22. The resultant fuel/air mixture is then exhausted through the outlet 28 into the appropriate portion of the combustion chamber 17 whereupon combustion takes place.

When the gas turbine engine 10 is required to operate on gaseous fuel, the liquid fuel flow to the manifold 29 is stopped and gaseous fuel is directed to the manifold 34. The fuel exhausts from the manifold 34 through the jets 35 whereupon it mixes with air which has been exhausted from the passages 23 through the outlet 33. Combustion of the resultant fuel/air mixture then follows.

An annular manifold 38 is provided adjacent the upstream end 36 of the main body portion 19 of the fuel injector 18. The manifold 38 is located, by means of a support arm 39, coaxially with the axis 21 of the fuel injector 18. The support arm 39 defines a passage 40 which interconnects the interior 41 of manifold 38 with a source (not shown) of high pressure steam.

The downstream end 42 of the steam manifold 38 is open and receives the upstream end 43 of the mid-body 26 so that together they cooperate to define radially inner and outer outlets 44 and 45 respectively for steam to be exhausted from the manifold 38. Vanes 46 interconnect the mid-body 26 and the steam manifold 38 in order to ensure that their position relative to each other are fixed.

The steam manifold outlets 44 and 45 are thus located adjacent the upstream ends of the passages 22 and 23 respectively extending through the main body position 19 and are so positioned and arranged as to direct steam into those passages 22 and 23.

The steam manifold outlets 44 and 45 are each of smaller cross-sectional area than the upstream ends of the passages 22 and 23 respectively which they confront. Moreover the steam manifold 38 is so configured and located that high pressure air from the gas turbine engine region 37 can flow around the manifold 38 and into the passages 22 and 23.

When the gas turbine engine 10 is started and run up to its normal operating speed, air alone from the region 37 passes through the passages 22 and 23 and either gaseous or liquid fuel is used in the manner described earlier. However when the engine 10 has reached a predetermined operating speed, high pressure steam is fed through the passage 40 of the support arm 39 and into the steam manifold 38 associated with each of the fuel injectors 18. The steam within the manifold 41 is arranged to be of a higher total pressure then that of the air flowing through the passages 22 and 23 so that substantially all of the steam exhausted from the manifold outlets 44 and 45 flows into the passages 22 and 23 respectively and not around the exterior of the fuel injector main body 19.

The volume of steam directed into the passages 22 and 23 is chosen so that within the passages 22 and 23, the air content is not greater than about 20% by weight of the total air/steam mixture within the passages 22 and 23. Moreover the steam and fuel flows are controlled within a specific predetermined range.

It will be seen therefore that when steam is directed into the main body passages 22 and 23, that steam is the predominant fluid in those passages and takes over from air the role of fuel atomisation (when liquid fuel is used). The injection of steam into the primary combustion zone leads to a reduction in the emission of the oxides of nitrogen and/or permits an increase in engine power.

The arrangement for the introduction of steam into each of the fuel injectors 18 ensures that the engine 10 is capable of operating using a mixture of steam and air and, if steam should not be available, the normal supply of air through the burner is maintained.

We claim:

1. A fuel injector suitable for a gas turbine engine comprising a main body portion having an upstream end and a downstream end, said upstream end being operationally in communication with a region of air at high pressure, said main body portion having at least one passage therin interconnecting said upstream and downstream ends thereof so as to provide an air flow through said main body portion which exhausts from said downstream end thereof, means adapted to direct fuel into said air flow so as to provide intermixing therewith, and steam injection means located in the region of the upstream end of said main body portion, said steam injection means being so configured and arranged as to operationally permit said air flow through said at least one passage from said region of air at high pressure and optionally direct steam into said at least one passage, the total exhaust area of said stem injection means being less than the total inlet area of said at least one passage and the total pressure of steam at the exhaust outlet of said steam injection means when steam is exhausted therefrom being higher than the pressure operationally within said at least one passage so that at least the majority of steam so directed enters said at least one passage, a portion of said injector main body cooperating with said steam injection means to define said steam outlet from said steam injector.

2. A fuel injector as claimed in claim 1 wherein said at least one passage is of annular cross-sectional shape.

3. A fuel injector as claimed in claim 1 wherein said steam injection means is of annular form.

4. A fuel injector as claimed in claim 1 wherein the downstream end of said at least one passage has a radially outwardly directed component with respect to the longitudinal axis of said fuel injector.

5. A fuel injector as claimed in claim 1 wherein said injector is so arranged that sufficient steam is operationally directed into said at least one passage to provide that the air content within said at least one passage is not greater than 20% by weight.

6. A fuel injector suitable for a gas turbin engine comprising a main body portion having an upstream end and a downstream end, said upstream end bein operationally in communication with a region of air at high pressure, said main body portion having at least one passage therein interconnecting said upstream and downstream ends thereof so as to provide an air flow through said main body portion which exhausts from said downstream end thereof, means adapted to direct fuel into said air flow so as to provide intermixing therewith, and steam injection means located in the region of the upstream end of said main body portion, said steam injection means including an exhaust outlet, said steam injection means being so configured and arranged as to operationally permit said air flow through said at least one passage from said region of air at high pressure and optionally direct steam into said least one passage, the total exhaust area of said steam injection means being less than the total inlet area of said at least one passage and the total pressure of steam at the exhaust outlet of said steam injection means when steam is exhausted therefrom being higher than the pressure operationally within said at least one passage so that at least the majority of steam so directed enters said at least one passage, said means adapted to direct fuel into said air flow being situated internally of said main body portion and being adapted to direct fuel into said at least one passage, said fuel injector beinig provided with two of said passages interconnecting said upstream and downstreams ends of said main body portion and additional fuel injection means being situated on said downstream end of said main body portion, said additional fuel injection means being adapted to direct fuel into the air flow exhausted from the passage which does not have fuel injected thereinto.

* * * * *